June 4, 1957   F. TRINCA   2,794,875
COMMUTATOR MOUNTING FOR PNEUMATIC TIRE PRESSURE ALARMS
Filed Nov. 26, 1954
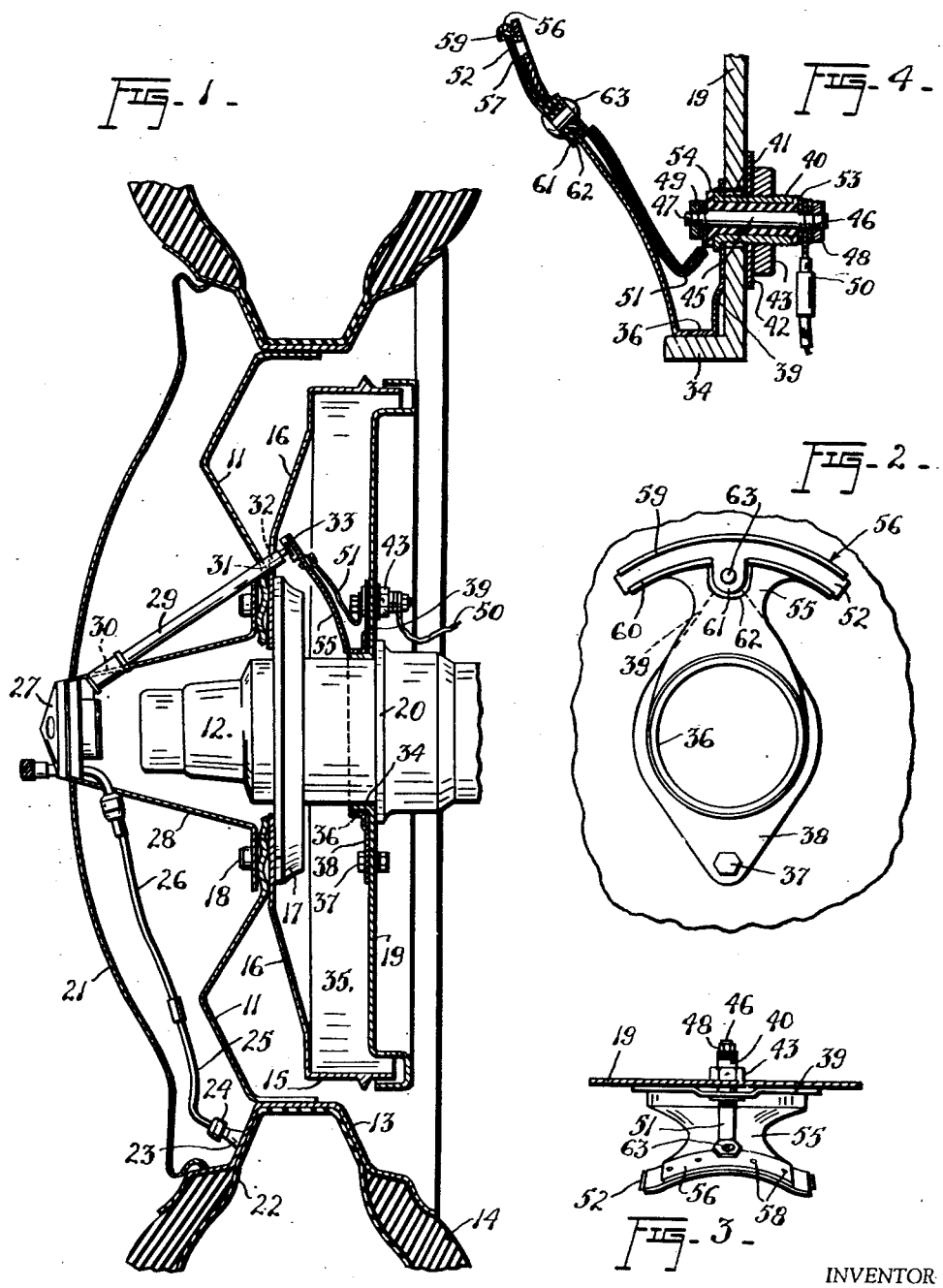
INVENTOR
Frederick Trinca
BY Albert J. Kramer
ATTORNEY

United States Patent Office 2,794,875
Patented June 4, 1957

2,794,875

COMMUTATOR MOUNTING FOR PNEUMATIC TIRE PRESSURE ALARMS

Frederick Trinca, Long Island City, N. Y.

Application November 26, 1954, Serial No. 471,362

7 Claims. (Cl. 200—61.25)

In my prior copending application for Patent, Ser. No. 441,238, filed July 6, 1954, now Patent No. 2,752,786, issued July 3, 1956, I have described a device which includes a commutator strip member on the exterior of the brake drum of a vehicle as an electrical contact in an alarm circuit for a plunger which normally rotates with the wheel in an orbit adjacent the strip and which is movable to contact the strip under the action of a gage member actuated by pressure changes in the tire carried by the wheel.

The present invention is an improvement in the mounting of the commutator strip and an object thereof is the provision of an improved type of mounting which maintains the commutator strip as well as the contact end of the plunger in an enclosed space to prevent or reduce the accumulation of dirt, dust, corrosion and other foreign matter thereon which would cause an electrical insulation of these parts with respect to each other.

Another object of the invention is the provision of a mounting for the commutator strip which utilizes the space within the brake drum chamber and in such a way as to eliminate the necessity of any dismantling thereof when repairs or adjustments to the wheels become necessary.

A further object of the invention is to place the strip member as close as possible to the center of the wheel so as to reduce strains and vibrations due to centrifugal force and also to reduce road shock.

These and other objects and advantages of the invention will appear more fully from the following description considered together with the accompanying drawing.

In the drawing:

Fig. 1 is a cross-sectional view of the wheel of an automobile, partly broken away, showing a representative embodiment of the invention mounted thereon.

Fig. 2 is a front elevational view of the same embodiment, apart from the automobile wheel.

Fig. 3 is a top plan view of the embodiment.

Fig. 4 is an enlarged fragmentary cross-sectional view showing the electrical terminal for the commutator strip.

Referring with more particularity to the drawing in which like numerals designate like parts, the numeral 11 designates the wheel body of an automobile or other wheeled vehicle, fixed to and rotatable with its hub 12 and carrying a channeled rim 13 in which is mounted a pneumatic tire 14 which may be of any conventional type, including the tubeless type.

The body supports a brake drum 15 and a radial brake drum flange 16. The drum 15 is secured to the wheel hub plate 17 by bolts 18 and the usual cover or back plate 19 is secured to the axle housing 20 by welding or any other suitable means. These parts may be of any conventional types, the types shown in the drawing being for illustrative purposes only.

The wheel body structure illustrated may include a detachable outer cover plate 21 removably secured in place by any suitable fastening or retaining means. The tire 14 has an inner tube 22 provided with the usual valve 23 which projects through a hole in the rim 13 in the space between the cover plate 21 and the wheel body 11.

The outer end of the valve 23 is provided with the usual external threads for engaging a coupler or union 24 swiveled to one end of a flexible tube 25 of rubber or any other suitable flexible material. The end of the flexible tube also contains a depression finger (not shown) to hold the valve stem in its open position. The other end of the rubber tube is connected to the end of a pipe 26 leading to a pneumatic gage 27. The body of the gage is mounted at the outer end of a central frustro-conical bracket 28. The bracket 28 surrounds the hub 12 of the wheel and is secured in place by the wheel lugs 18.

The gage member 27 includes an elongated or pencil-like dependent member 29 which projects outwardly and rearwardly therefrom through an aperture 30 in the bracket 28, an aperture 31 in the wheel body, and an aperture 32 in the brake drum flange 16.

The member 29 slidably carries a spring-cushioned finger or plunger 33 at its outer end which is movable in response to pressure changes in the gage. The movement of this plunger is outward when the pressure drops.

The back plate 19 has an annular flanged portion 34 at the center projecting within the brake drum chamber 35. In accordance with this invention, an annular collar 36 is disposed about the annular flanged portion 34 and is secured to the back plate 19. One of the securing means comprises a bolt 37 which passes through a lobe flange 38 of the collar and through the back plate 19. The other securing means is associated with a lobe flange 39 diametrically opposite the lobe flange 38 and includes also an electrical terminal. It comprises a hollow threaded shank 40 inserted in an aperture of and connected to the lobe flange 39. The shank 40 extends rearwardly from the lobe flange 39 and passes through an aperture 41 of the back plate 19 to receive a lock washer 42 and a nut 43 on the other side.

The hollow part of the shank 40 carries an electrical insulating tube 44 and this tube, in turn, carries a metal core 45. The ends 46 and 47 of the core project beyond the ends of the tube 45 and are threaded to receive nuts 48 and 49, respectively. The rearward end 46 is for connection to an electrical wire 50 of the alarm circuit (not shown) and the forward end 47 is for connection to one end of a wire 51 leading to the commutator strip 52. The wires 50 and 51 are insulated from the ends of the shank 40 by insulating washers or flanges 53 and 54.

The commutator strip 52 is of an electrical conducting metallic material, such as copper, brass, etc., and it is supported on a portion 55 integral with, and projecting upwardly and forwardly from, the collar 36. The strip 52 is arched and is held in a correspondingly arched channel 56 from which it is electrically insulated by an insulating liner 57 of paper, plastic, or any other suitable material, between the strip and the channel. The channel 56 is firmly secured to the portion 55 by rivets 58 or any other suitable securing means, and the strip 52 is held in place by crimping the edges 59 and 60 of the channel.

The strip 52 has an integral lobe portion 61 which is inwardly offset and also electrically insulated from the portion 55 by an extension 62 of the liner.

The lobe portion 61 is connected to the wire 51 by means of a rivet 63 or any other suitable means. The rivet passes through the portion 61, but is electrically insulated therefrom.

The position of the strip 52 is adjacent and parallel to the orbit of revolution of the end of the finger 33 so as to make contact therewith when the finger protracts from the member 29 due to a drop of air pressure in the tire. The ends of the strip 52, together with the corresponding ends of its supporting channel 56, are bent backward somewhat to prevent side swiping of the finger 33 as it moves toward the strip, particularly in cases of sudden drop in pressure, such as may be caused by a blow-out, puncture, etc.

The gage 27 and its appurtenant parts, including the dependent member 29 and finger 33, are grounded portions of the electrical circuit referred to above, and contact between the finger 33 and the strip 52 is effective to close the circuit of the electrical alarm or indicator device.

Having thus described my invention, I claim:

1. A commutator bracket for the interior of a vehicle brake drum chamber, said chamber having a non-rotatable back cover plate, said bracket comprising a support member, means, including an annular collar, for holding the member in a fixed position relative to said plate, an arched electrical conducting strip carried by the member concentric with the collar, and electrical insulating means between the strip and said member.

2. A commutator bracket for the interior of a vehicle brake drum chamber, said chamber having a non-rotatable back cover plate, said bracket comprising a support member, means, including an annular collar, for holding the member in a fixed position relative to said plate, an arched electrical conducting strip concentric with the collar, a correspondingly arched channel member for holding said strip, a liner of electrical insulating material between said channel and strip, means securing the channel to the member, an electrical terminal post carried by the collar, and means insulated from the member for electrically connecting the strip to the said post.

3. A commutator bracket as defined by claim 2 in which the electrical terminal post is insulated from and surrounded by a hollow threaded shank secured to the support member, said shank being presented as a bolt for securing the member in a fixed position.

4. In a vehicular wheel assembly having a rotatable hub and a stationary axle housing, a brake drum and brake drum flange mounted for rotation with the wheel, a stationary brake drum cover plate secured to the axle housing, a gage member having a dependent protractable finger member carried by the wheel and a commutator strip connected to the said plate in a position adjacent the orbit of revolution of the outer end of the finger member; said commutator strip being disposed between the drum flange and plate and said drum flange having an opening therein for insertion of the finger member therethrough adjacent the strip.

5. In a vehicular wheel assembly as defined by claim 4 in which the commutator strip is carried by a bracket, electrical insulating means between the strip and the bracket, and means for securing the bracket to the drum cover plate.

6. In a vehicular wheel assembly as defined by claim 5 in which the means for securing the bracket to the drum cover plate comprises a hollow shank, an electrical terminal in the hollow portion of the shank, electrical insulating means between the shank and the terminal, and an electrical conductor, independent of the bracket, connecting the strip with the terminal.

7. A commutator strip bracket comprising an annular ring, said ring having an outwardly flanged edge, means associated with the flanged edge for securing the bracket to the back cover plate of an automobile wheel brake drum, said ring having a member projecting diagonally outward on the side opposite the flange, an arched strip concentric with the ring carried by said member, electrical insulating means between the strip and the said projecting member, an insulated electrical terminal carried by the bracket, and an electrical conductor, independent of the bracket, connecting the strip with the said terminal.

References Cited in the file of this patent

UNITED STATES PATENTS

| | | |
|---|---|---|
| 2,316,461 | Schubert | Apr. 13, 1943 |
| 2,334,443 | Schubert | Nov. 16, 1943 |